United States Patent Office 2,786,645
Patented Mar. 26, 1957

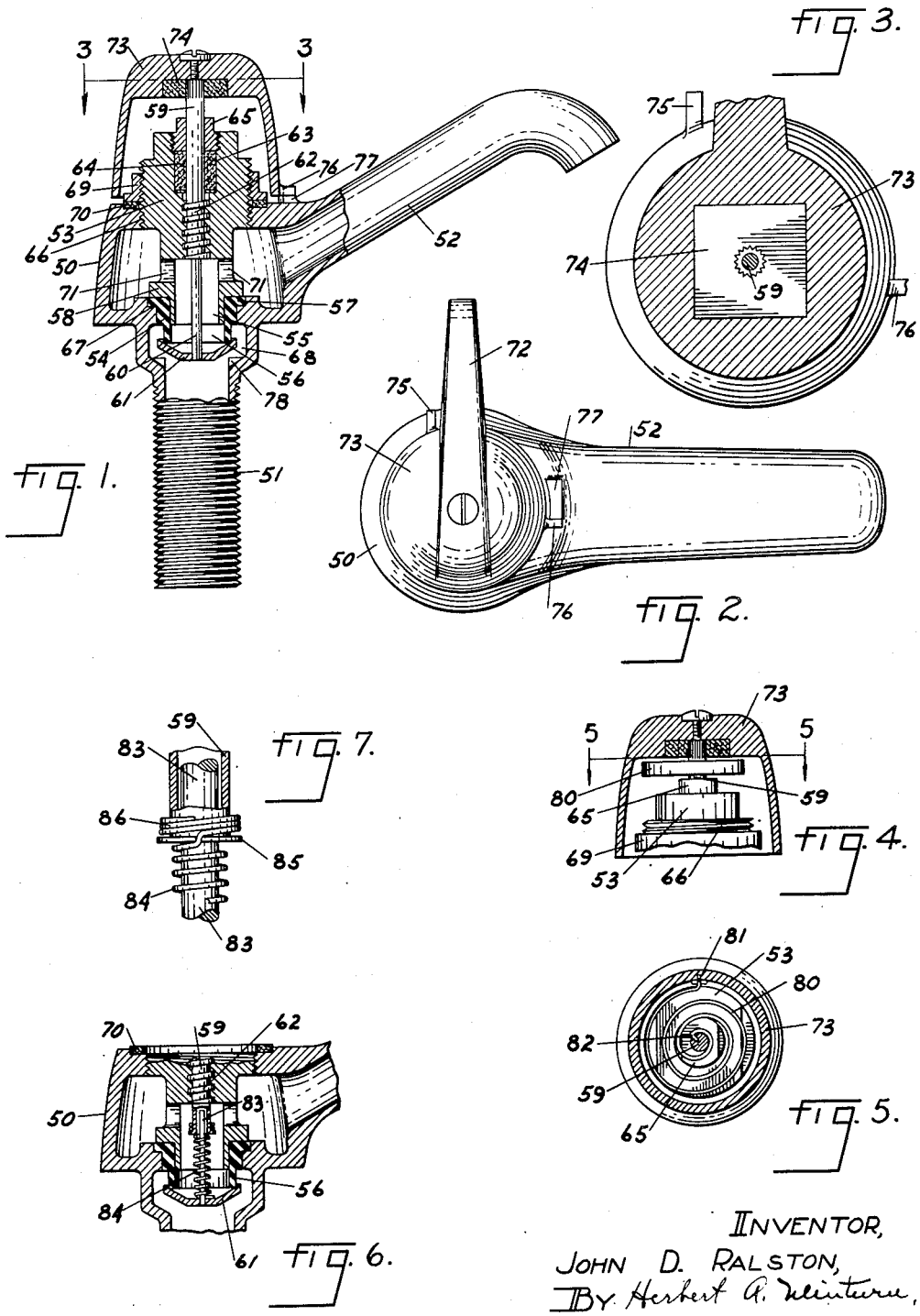

2,786,645

LINE SEATING CONICAL VALVES

John D. Ralston, Indianapolis, Ind.

Application February 19, 1953, Serial No. 337,754

6 Claims. (Cl. 251—333)

This invention involves a valve for controlling the flow of fluids including both gases and liquids. The invention involves elementarily a resilient, elastic valve seat tubular in nature, over which seat there may be applied a valve having a frusto-conical cross-sectional shape at a line of contact between the valve and the outer perimeter of the end of the valve seat.

The invention may be employed in many, many applications a few examples of which include the ordinary water faucet wherein the advantage lies in the fact that there will be no after drip when the valve is closed and neither will there be any water hammer effect or chattering upon operation of the valve; pneumatic tire valve stems wherein a very simple yet most effective form of the invention may be employed at a considerable lowering of cost as compared to previously employed valves for this purpose; aerosol dispensers wherein various mechanical embodiments of the invention may be employed to meet the wide range of valve operations demanded; and in such installations where the valve may be automatically operated such as by magnetic devices, hydraulic or pneumatic controls, or even manual controls.

A further primary purpose of the invention is to provide an exceedingly durable structure which may be usable over practically indefinite periods of time without appreciable wear. A still further primary object of the invention resides in the fact that by use of the valve, very precise controls of fluid flows may be had in respect to precision opening and closing for very close measurement of the flows.

The invention also embodies the use of the Torricellian tube effect to the end that when the valve closes, there is a slight deformation of the valve seat causing a reduction in diameter of the bore through the seat which is in effect a tube to the end that the valve seat, due to its elasticity, upon returning to its approximately original shape before being closed by the valve, will set up a "drawback" action which pulls back the end of the column of the liquid in the conduit leading from the valve so that there is no exposed liquid immediately at the end of that conduit, and consequently the drip heretofore encountered in other types of valves is eliminated. This principle is referred to in my U. S. Patent No. 2,619,116 issued November 25, 1952, and is carried forward in a structure herein illustrated and described.

Further objects and advantages of the invention will become apparent to those versed in the art in the following description of the invention as illustrated in the accompanying drawings, in which—

Fig. 1 is a view in central vertical section through a water faucet in which the invention is embodied;

Fig. 2 is a top plan view of the water faucet;

Fig. 3 is a horizontal section on the line 3—3 in Fig. 1 on an enlarged scale;

Fig. 4 is a view in central vertical section through the upper end of the water faucet showing a modified form of operating handle interengagement with the valve stem;

Fig. 5 is a transverse section on the line 5—5 in Fig. 4;

Fig. 6 is a detail in central vertical section illustrating a valve stem modified interconnection from that shown in Fig. 1;

Fig. 7 is a detail in partial section on an enlarged scale of the interconnection shown in Fig. 6.

In the form of the invention herein selected to illustrate it, there is shown the application of the valve to a water faucet such as would be employed at a lavatory. In this usage, the valve constituting my invention solves many of the difficulties which have heretofore been present in the various forms and constructions of such faucets.

Referring to Fig. 1, the valve is provided with a body 50 from which depends in the usual manner a connecting nipple 51. From one side of the body 50 there extends the delivery tube 52. A subassembly is made up based upon a core 53 which carries a flexible, elastic seat 54 around a tubular extension 55. The seat 54 seats by a base end flanged portion 57 against the end 58 of the core 53.

A valve stem 59 screw-threadedly enters axially into the core 53 and has a reduced diameter stem 60 extending on down below, on the end of which stem 60 there is fixed a valve cup 61. This valve cup 61 has a frusto-conical depression therein on the side toward the lower end of the seat 54. The seat 54 has its lower end terminating in a plane at right angles to the axis of the stem 60. The overall diameter of the cup 61 is such that it will extend slightly beyond the external diameter of the tubular end 56 of the seat 54, so that when the cup 61 is drawn upwardly against the tube end 56, the inner face of the conical section of the cup 61 will come into a circular line contact with the outer peripheral corner of the lower end of the tube 56.

The stem 59 is provided with a multiple threaded portion 62 so that vertical travel of the cup 61 is considerable in relation to the turning of the stem 59 in respect to the core 53. The threaded portion 62 has at least a two-thread formation of rather long pitch.

The core 53 is provided with a stuffing box 63 into which packing 64 is fitted to have a stuffing nut 65 screw-threadedly enter the box 63 in order to compact the stuffing 64 around the upper end of the stem 59 above the threaded portion 62.

This core assembly thus described is entered through the top side of the body 50 to have the external surface of the core 53 screw-threadedly engage by the threads 66 in the upper portion of the body, and extend on downwardly into the body to have the valve seat 54 carried down to seat by its flanged end 57 against an annular shoulder 67, with the tubular end 56 extending freely into a chamber 68 in turn communicating with the interior of the nipple 51. By running the core 53 down on the threads 66, the flange 57 of the seat 54 is compressed into a fluid tight engagement around the flange 67. Then a fluid tight joint is made by running a nut 69 down over the external threaded portion of the core 53 from the top end thereof to compress between the nut 69 and the top side of the body 50 a sealing gasket 70. The core 53 has the bore of the tube end 55 carried upwardly therein a distance, and from this bore 55 there is provided a plurality of lateral openings 71 so that fluid entering through the nipple 51 and around the cup 61 through the tube 56 may discharge into the inside of the body 50 which serves as an expansion chamber, and then finally discharge through the tube 52.

An operating handle 72 extends from a member 73 which is in the nature of an inverted cup. This cup 73 is of sufficient diameter and height to freely cover over the upper end of the core 53 assembly, and to have the upper end of the stem 59 enter a connecting block 74 which is fitted in the upper portion from the inside of the cup 73. The upper end of the stem 59 is splined to fit compressively into the block 74 as best indicated in Fig. 3. Thus by rotating the handle 72 in horizontal directions, the stem 59 may be rotated to cause it to advance upwardly and downwardly in respect to the core 53, and accordingly to lower and lift the valve cup 61.

Since the tube 56 is quite flexible as well as elastic, it is necessary that some means be provided to limit the degree of rotation of the handle 72 to prevent damage being occasioned to this tube 56 in the closing operation of bringing the valve cup 61 thereagainst. One particular way for limiting the vertical travel of the cup 61 is to provide a pair of stops 75 and 76 on the cup member 73 which will be in the path of a post 77 as an integral part of the valve body 50 to extend upwardly between those two posts 75 and 76. When the handle 72 is in the "off" position with the cup 61 brought against the end of the tube 56, the post 76 will be in contact with the member 77. Then when the valve is to be opened, the handle 72 is rotated to bring it into substantial parallelism with the tube 52, when the post 75 will contact the member 77 from the side opposite that side which is contacted by the post 76. This post 75 may be dispensed with by providing one or more lugs 78 extending outwardly inside of the chamber 68 in the path of the cup 61 when it is lowered so as to limit the down travel of the cup 61, that travel not being so critical as is the upward travel when the cup 61 comes to the shutting off position.

In any applications of the valve construction constituting the present invention, it is not necessary that the cup be forced against the end of the valve seat tube with any degree of pressure above that which will bring the cup into intimate contact, that is in line contact, with the outer corner of the open end of the tube, in which position, fluid flow is effectively stopped. There need be no crushing effect of the tube 56 beyond that limited degree required in the corner zone to retain the cup in sealing contact.

To further emphasize the need for preventing crushing of the end of the valve seat tube, other structural forms may be employed such as are illustrated for example in Figs. 4–7 inclusive. Referring to Figs. 4 and 5, the stop posts 75 and 76 and the member 77 may be eliminated, if desired, and in their place a helical spring 80 is used. As illustrated in Fig. 5, this spring 80 has one end 81 engaged in the wall of the cup 73 and the other end 82 engaged in the stem 59.

Since the threaded portion 62 of the stem 59 may be selectively made in either right or left hand forms for hot and cold water usages, the spring 80 may be reversed in respect to its "winding up" and unwinding when the cup 73 is rotated. As illustrated in Fig. 5, the spring 80 is turned in that direction which will cause it to wind up when a right handed thread is used on the stem 59. That is, when the cup 73 is rotated counterclockwise as viewed in Fig. 5, the spring 80 tends to unwind and accordingly pull the valve stem 59 around in the same direction. In rotating the cup 73 in the clockwise direction, the spring 80 will tend to wind up and accordingly tend to rotate the stem 59 accordingly. The action may be reversed, the purpose being to insert a yielding coupling between the operating handle 72 and the valve stem 59.

A different form is illustrated in Figs. 6 and 7 wherein the valve cup 61 has a rather short stem 83 loosely fitting into the lower end of the screw-threaded stem 59, the stem 83 taking the place of the stem 60 as illustrated in Fig. 1. The cup 61 is then interconnected in driving relation with the stem 59 by means of a coiled spring 84 which has its lower end fixed to the cup 61 and encircles the stem 83 to be carried up and over a flange 85 formed on the lower end of the stem 59, Fig. 12, where the spring 84 is given a number of turns 86 to permit the stem 59 to revolve within those coils 86. The spring 84, when the cup 61 is spaced from the seat 54, is in that state where the turns of the spring are substantially in contact one with another.

When the stem 59 is rotated to cause it to have longitudinal travel, assuming that the stem 59 is advancing upwardly, the cup 61 will be pulled upwardly by reason of the spring 84 being interengaged with the cup 61 and the lower end of the stem 59. When the cup 61 reaches the tube 56 and comes into contact therewith, further turning of the stem 59 will cause the spring 84 to stretch. In this regard, the spring 84 is of a rather "light" construction so that it may be readily lengthened longitudinally to prevent distortion of the valve seat 54 beyond that as above indicated. Then when the stem 59 is rotated in the opposite direction, the cup 61 will be pushed downwardly by the spring 84 bearing between the flange 85 and the cup 61. In this way, the spring 84 serves as a factor of safety to prevent undue pressure of the cup 61 against the tube 56. Furthermore, in this construction as shown in Figs. 6 and 7, the cup 61 is not in fixed engagement with the stem 59, but can yieldingly travel axially.

By the terms "resilient" and "flexible" as used herein in reference to the seat, it is meant that the seat is deformable to some degree at least in respect to reducing the effective volume of the bore through the seat and, due to the elasticity of the seat, restoration travel of the seat from its deformation will occur, but at no time does the valve cup leave its closing line contact around the seat end in the valve closed end. That is, when the valve cup yieldingly moves against the valve seat, the initial momentum of the cup will cause it to set up the deformation to a degree beyond that normally maintainable by the fluid pressure thereagainst in a closed position, and the elasticity of the valve seat will "draw back" the cup to a normal fluid pressure maintained position, inducing a fluid "draw-back" in the valve seat bore.

The cavity in the cup, the surface of which cavity comes into sealing contact with an outer portion of the valve seat, has been referred to as being conical in shape. A broader term such as a concave surface may be employed, because the cavity could equally as well be frusto-conical in shape or may have a spherical or semi-spherical contour. The important thing is that this wall of the cavity of the sealing cup be such that at all times the slope of the surface at the line of contact between the cup surface and the seat be an acute angle. Therefore, in the appended claims, the broader term "concave" is employed and by that term is included the conical shape.

In summary, it is to be noted that in all of the conceivable forms of application of the invention, the fundamental structure would persist throughout these various applications in that there is the combination included in these structures of the elastic seat having at least a free outer wall portion, elastic in nature, over which the cup end of the valve closing member, generally termed a cup in the above description, is seated, to have essentially a line contact seal between the cup and the seat member, and furthermore, the cup is so positioned in relation to the flow of the liquids or gases that the cup member tends to be seated by the pressure thereof.

Further, in regard to the use of the invention in a water faucet, the heretofore disturbing elements of water hammer and chattering are eliminated due primarily to the end of the flexible and elastic tube being exposed on the pressure size of the valve, and the fact that there is a chamber about that exposed end so that the fluids being stopped in their flow by the closure of the valve can in effect to some degree at least compress that exposed seat end and then allow that end to return to its normal position under pressure while the cup remains seated at all times. Also, particularly when the faucet is used to control hot water flow, the generally heretofore difficulty of a leak through the faucet starting after the faucet has become cool is entirely eliminated due to the fact that the stem which controls the lifting of the cup from the seat is on the discharge side, and it may contract and tend to seat the cup on the seat a little more firmly under that contracting action due to the change in temperature.

While I have herein shown my invention in the various forms and applications, I do not desire to be limited to those precise applications or forms beyond the limitations which may be imposed by the following claims, since structural variations may be employed without departing from the spirit of the invention.

I claim:

1. A valve structure for a fluid flow line comprising a tubular valve seat in the nature of rubber, elastic both longitudinally and transversely and having a longitudinal passageway therethrough, through which said flow is had; a seat holding member interposed in said fluid flow line having discharge and approach sides; means retaining said seat on said member with an externally exposed free length of the seat extending beyond said retaining means on its fluid approach side and terminating by an open end having an outer circumferential corner defined substantially as a circular line spaced from the margin of the opening at said end of the tubular seat; said retaining means being confined to the discharge end of said seat; a valve cup having an interior conical wall of a lower end diameter greater than the diameter of said seat corner line located to engage over said seat end and engage said corner line by said conical wall; means for lifting said cup against fluid flow from said line engagement; and yielding means interposed between said cup and said lifting means permitting and limiting deformation of said valve seat upon engagement of the cup with the seat around said line.

2. The structure of claim 1 in which said cup lifting means comprises a stem connected with the cup, and an operating member, and said yielding means comprises a spring interconnecting with the stem and the operating member.

3. The structure of claim 1 in which said yielding means consists of a helical spring and has one end fixed to said stem and the other end fixed relative to retaining means.

4. The structure of claim 2 in which said stem telescopes with said operating member for relative longitudinal travel therebetween.

5. A valve structure comprising an elastic tubular seat in the nature of a rubber tube and a flow passageway axially therethrough from an inlet to a discharge end; a valve member supporting one end of said seat tube to have an inlet length thereof freely exposed in respect to lateral support, the inlet end portion of the tube having a square end with an outer circular corner line therearound; an internally conical valve cup fitting over said line to seat thereon; and a stem engaging said cup as means to displace it from said seating, said cup being revoluble in respect to said tube seat end.

6. The structure of claim 5 in which said stem is rigid in part and longitudinally and radially elastic in part.

References Cited in the file of this patent
UNITED STATES PATENTS

| | | |
|---|---|---|
| 254,130 | Harrison | Feb. 28, 1882 |
| 691,569 | Pohlman | Jan. 21, 1902 |
| 721,766 | Williamson | Mar. 3, 1903 |
| 1,394,756 | Mueller | Oct. 25, 1921 |
| 2,192,339 | Wilson | Mar. 5, 1940 |
| 2,346,938 | Oravec | Apr. 18, 1944 |
| 2,619,116 | Ralston | Nov. 25, 1952 |